United States Patent
Ko et al.

(10) Patent No.: US 8,009,746 B2
(45) Date of Patent: Aug. 30, 2011

(54) UPLINK SIGNAL RECEIVING METHOD AND APPARATUS USING SUCCESSIVE INTERFERENCE CANCELLATION IN WIRELESS TRANSMISSION SYSTEM BASED ON OFDMA

(75) Inventors: Seong-Yun Ko, Suwon-si (KR);
Joo-Yong Park, Seongnam-si (KR);
Myeon-Kee Youn, Incheon (KR)

(73) Assignee: Samsung Electronics Co., Ltd (KR)

( * ) Notice: Subject to any disclaimer, the term of this patent is extended or adjusted under 35 U.S.C. 154(b) by 1262 days.

(21) Appl. No.: 11/636,850

(22) Filed: Dec. 11, 2006

(65) Prior Publication Data

US 2007/0217529 A1 Sep. 20, 2007

(30) Foreign Application Priority Data

Mar. 20, 2006 (KR) .................. 10-2006-0025447

(51) Int. Cl.
*H04K 1/10* (2006.01)
*H04L 27/28* (2006.01)
(52) U.S. Cl. ...................................... 375/260
(58) Field of Classification Search .......... 375/142, 375/144, 259, 260, 285, 324, 346; 370/203, 370/207, 328, 329, 334
See application file for complete search history.

(56) References Cited

U.S. PATENT DOCUMENTS

| | | | |
|---|---|---|---|
| 5,422,917 A | 6/1995 | Scott | |
| 6,091,702 A * | 7/2000 | Saiki | ............................. 370/203 |
| 6,373,861 B1 | 4/2002 | Lee | |
| 6,583,758 B2 * | 6/2003 | King | ....................... 342/357.77 |

(Continued)

FOREIGN PATENT DOCUMENTS

WO  WO 03/041300  5/2003

OTHER PUBLICATIONS

R. Fantacci et al., "Multiuser Interference Cancellation Receivers for OFDMA Uplink Communications with Carrier Frequency Offset", IEEE Communications Society, Globecom 2004, Nov. 29, 2004.

*Primary Examiner* — Dac V Ha
*Assistant Examiner* — Syed Haider
(74) *Attorney, Agent, or Firm* — The Farrell Law Firm, P.C.

(57) ABSTRACT

An uplink signal receiving method and apparatus using successive interference cancellation (SIC) in a wireless transmission system based on Orthogonal Frequency Division Multiple Access (OFDMA) are provided. The uplink signal receiving method includes storing in a provisional storage each uplink intermediate frequency (IF) signal received through an antenna of a base station and subjected to analog-to-digital conversion; analyzing the uplink IF signals stored in the provisional storage and determining a terminal to be restored; converting a data symbol of the determined terminal to be restored from a time domain into a frequency domain; performing channel/phase correction on the converted data symbol; demodulating the corrected data symbol; determining if there is a terminal to be restored; and when there is a terminal to be restored, removing the demodulated data symbol of the terminal to be restored from the temporarily stored uplink IF signals and then updating the uplink IF signals; thereby, to reducing interference between sub-carriers of the terminals caused by deviation of a center frequency of the sub-carriers of terminals constituting the uplink signal in the OFDMA-based wireless transmission system.

14 Claims, 8 Drawing Sheets

U.S. PATENT DOCUMENTS

| | | |
|---|---|---|
| 7,190,710 B2 | 3/2007 | Yousef et al. |
| 7,593,693 B1 * | 9/2009 | Kasapi et al. ............... 455/67.13 |
| 2002/0122381 A1 * | 9/2002 | Wu et al. ........................ 370/208 |
| 2004/0008614 A1 * | 1/2004 | Matsuoka et al. ............ 370/203 |
| 2004/0086027 A1 | 5/2004 | Shattil |
| 2005/0232202 A1 * | 10/2005 | Yano et al. ..................... 370/335 |
| 2006/0029159 A1 * | 2/2006 | Oh et al. ........................ 375/324 |
| 2006/0105761 A1 * | 5/2006 | Walton et al. ................. 455/423 |
| 2007/0217323 A1 | 9/2007 | Ko et al. |

* cited by examiner

UPLINK SIGNAL RECEIVING METHOD AND APPARATUS USING SUCCESSIVE INTERFERENCE CANCELLATION IN WIRELESS TRANSMISSION SYSTEM BASED ON OFDMA

PRIORITY

This application claims the benefit under 35 U.S.C. §119 (a) from an application entitled "UPLINK SIGNAL RECEIVING METHOD AND APPARATUS USING SUCCESSIVE INTERFERENCE CANCELLATION IN WIRELESS TRANSMISSION SYSTEM BASED ON OFDMA" filed in the Korean Intellectual Property Office on Mar. 20, 2006 and assigned Serial No. 2006-25447, the entire contents of which are hereby incorporated herein by reference.

BACKGROUND OF THE INVENTION

1. Field of the Invention

The present invention relates to an uplink signal receiving method and apparatus using successive interference cancellation (SIC) in a wireless transmission system based on Orthogonal Frequency Division Multiple Access (OFDMA).

2. Description of the Related Art

In general, Orthogonal Frequency Division Multiplexing (OFDM) is a technology for used carrying information to be transmitted on a plurality of mutually orthogonal sub-carriers.

OFDM is similar to Frequency Division Multiplexing (FDM) in that it makes use of many sub-carriers. Further, OFDM allows for spectrum overlapping between the sub-carriers due to their mutual orthogonality, and has a high bandwidth efficiency compared to FDM.

Further, an OFDM transmission system uses an OFDM symbol whose length is considerably longer than the impulse response of a channel, so that it is resistant to multi-path fading. In addition, the OFDM transmission system has a long symbol compared to a single carrier system, so that it is advantageous for high-speed transmission.

The conventional transmission system based on OFDM generally includes an OFDM transmitter and an OFDM receiver.

The OFDM transmitter converts raw data to be transmitted into an OFDM symbol, and caries the OFDM symbol on a radio frequency carrier. The OFDM receiver receives the OFDM symbol transmitted by the OFDM transmitter of the terminal, and restores the raw data transmitted at a transmission stage.

In the commercialized transmission system based on OFDM, it is more difficult to implement the receiver than the transmitter, and the performance of the receiver exerts a greater influence on transmission performance of the entire system than the performance of the transmitter. This is because the transmitter leaves no room for distortion of a signal, and thus generates an OFDM symbol having a high signal-to-noise (S/N) ratio, while the receiver needs to use a complicated signal processing algorithm for restoring a signal distorted by a wireless channel having multi-path properties and imperfect analog components. Furthermore, the signal processing algorithm needs to be varied depending on each system.

In general, the performance of a receiver improves as the complexity of its signal processing scheme increases. However, receivers with complex signal processing schemes are difficult to implement, and there is an increase in the size of their semiconductor components and consumption of power.

On generating the OFDM signal, because desired data can be carried on each sub-carrier, the OFDM system can be used as a multiple access system. The multiple access system is referred to as an Orthogonal Frequency Division Multiple Access (OFDMA) system.

In a wireless network to which the conventional OFDMA is applied, a downlink signal is generated only by the transmitter of a base station, and each terminal receiving the generated downlink signal decodes the received signal, and extracts only its own information.

An uplink signal received by the base station is the sum of signals generated by the terminals, each assigned a different sub-carrier and a different symbol interval. For this reason, reception performance of the base station can be lowered.

More specifically, there is a difference in a reference clock frequency used by different terminals to generate the OFDM signal, and thereby orthogonality between the sub-carriers constituting the uplink signal is easily disrupted.

A typical problem caused by a reference clock frequency difference between the terminals is mismatch between transmission carrier frequencies of the terminals.

It is assumed that the uplink is assigned to two or more terminals, the sub-carriers assigned to first and second terminals are alternately located, and the length of a symbol generated by each terminal is constant and indicated by T.

When a sub-carrier interval between neighboring sub-carriers is given by Equation (1(, orthogonality is maintained.

$$\Delta f = 1/T \tag{1}$$

where T is the symbol length of the transmission carrier frequency signal.

It can be found that, although each sub-carrier has complete orthogonality in each terminal, the transmission carrier frequency signals of terminals do not match, and thus $\Delta f$ is not maintained between the carriers in the uplink signal, the sum of the signals of the terminals.

When an offset between the transmission carrier frequency signals of the terminals making up the uplink signal takes place, orthogonality between sub-carriers making up the uplink signal is distorted, and thus interference between sub-carriers results, which directly deteriorates reception performance.

SUMMARY OF THE INVENTION

It is an aspect of the present invention to provide an uplink signal receiving method and apparatus using successive interference cancellation (SIC) in a wireless transmission system based on Orthogonal Frequency Division Multiple Access (OFDMA), capable of improving the reception performance of a transmission carrier frequency signal whose orthogonality is deteriorated by an offset of a transmission carrier frequency between different terminals in the OFDMA-based wireless transmission system.

According to an aspect of the present invention, there is provided an uplink signal receiving apparatus using successive interference cancellation (SIC) in a wireless transmission system based on Orthogonal Frequency Division Multiple Access (OFDMA), the uplink signal receiving apparatus includes a provisional storage for temporarily storing each uplink intermediate frequency (IF) signal that is received through an antenna of a base station and subjected to analog-to-digital conversion; a terminal selector for selecting a terminal that has a data symbol to be demodulated from the uplink IF signals stored in the provisional storage; a digital signal processor (DSP) for converting the data symbol of the selected terminal from a time domain into a frequency domain, correcting the data symbol which is converted into the frequency domain, demodulating the corrected data symbol into raw data, and outputting the demodulated raw data; and a symbol restorer for restoring the data symbol from the demodulated raw data, removing the restored data symbol from the uplink IF signals stored in the provisional storage, and then updating the uplink IF signals at the provisional storage.

According to another aspect of the present invention, there is provided an uplink signal receiving method using successive interference cancellation (SIC) in a wireless transmission system based on Orthogonal Frequency Division Multiple Access (OFDMA), the uplink signal receiving method includes storing in a provisional storage each uplink intermediate frequency (IF) signal received through an antenna of a base station and subjected to analog-to-digital conversion; analyzing the uplink IF signals stored in the provisional storage and determining a terminal to be restored; converting a data symbol of the terminal to be restored from a time domain into a frequency domain; performing channel/phase correction on the converted data symbol; demodulating the corrected data symbol; determining if there is a terminal to be restored; and when there is a terminal to be restored, removing the demodulated data symbol of the terminal to be restored from the temporarily stored uplink IF signals and then updating the uplink IF signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Hereinafter, an uplink signal receiving method and apparatus using successive interference cancellation (SIC) in a wireless transmission system based on Orthogonal Frequency Division Multiple Access (OFDMA) in accordance with the present invention will be described in full detail with reference to the accompanying drawings. The system construction described below is only one example of a construction falling within the scope of the present Invention. It should be understood by those skilled in the art that the present invention is no way limited by the following disclosure.

Figure 1:
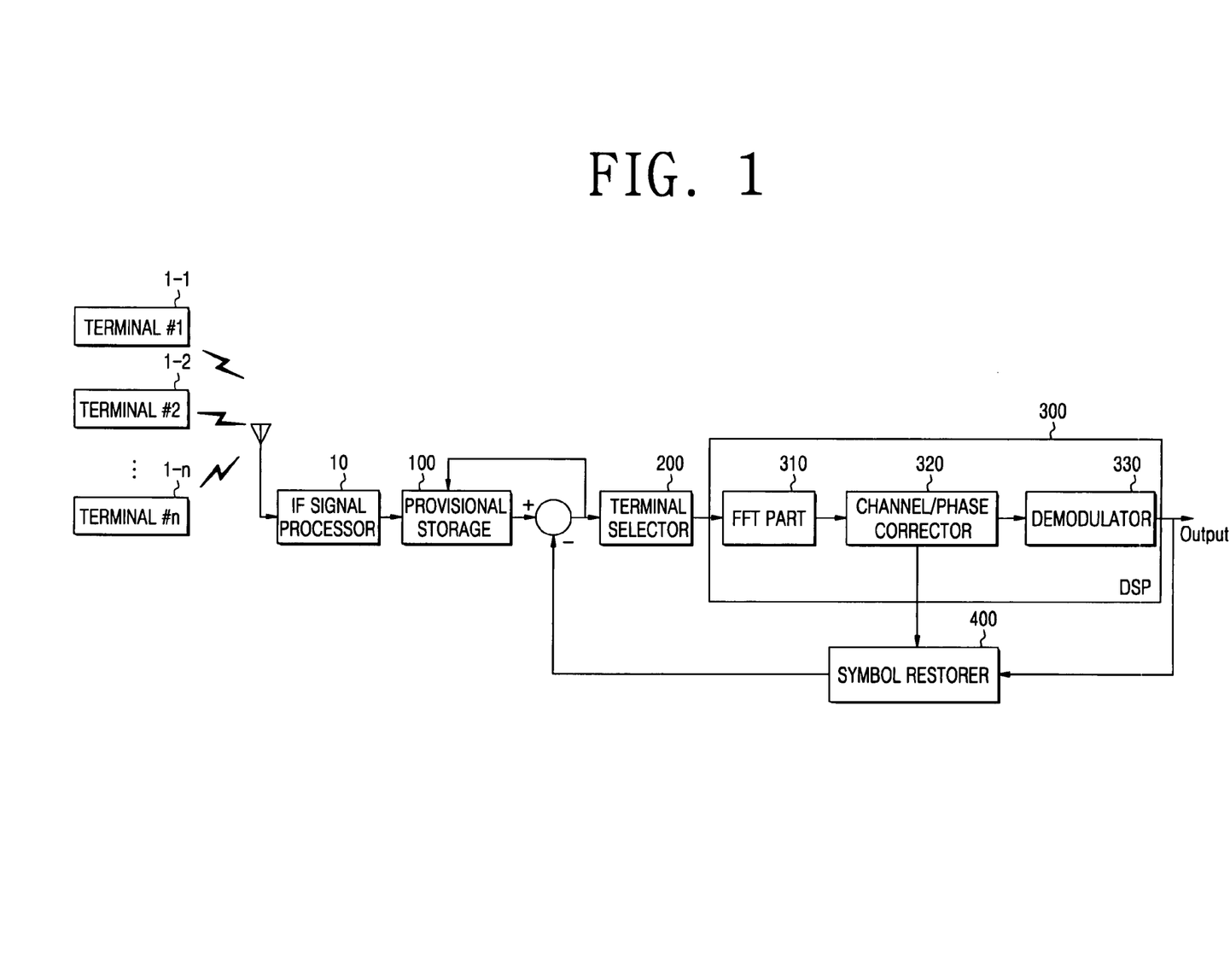
FIG. 1 illustrates the construction of an uplink signal receiving apparatus using successive interference cancellation (SIC) in a wireless transmission system based on Orthogonal Frequency Division Multiple Access (OFDMA) in accordance with the present invention.

FIG. 1 illustrates the construction of an uplink signal receiving apparatus using SIC in a wireless transmission system based on Orthogonal Frequency Division Multiple Access (OFDMA) in accordance with an exemplary embodiment of the present invention. The uplink signal receiving apparatus comprises a provisional storage 100, a terminal selector 200, a digital signal processor (DSP) 300, and a symbol restorer 400.

The provisional storage 100 temporarily stores uplink intermediate frequency (IF) signals, each of which is received through the antenna of a base station and subjected to analog-to-digital conversion in the IF Signal Processor 10.

The terminal selector 200 selects a terminal that has a data signal to be demodulated from the uplink IF signals stored in the provisional storage 100.

Further, while converting the data symbol of the selected terminal from a time domain into a frequency domain, the DSP 300 corrects the data symbol of the corresponding terminal which is converted into the frequency domain, demodulates the corrected data symbol into raw data, and outputs the demodulated raw data.

The DSP 300 includes a Fast Fourier Transform (FFT) part 310, a channel/phase corrector 320, and a demodulator 330.

The FFT part 310 converts the data symbol from the time domain into the frequency domain.

The channel/phase corrector 320 corrects phase distortion caused by influence of a wireless channel between the terminal transmitting a Quadrature Amplitude Modulation (QAM) signal intended for recovery and the base station, and other physical defects.

The demodulator 330 determines the QAM symbol to compensate for the influence of the wireless channel and other physical defects using hardware or software, demodulates the determined QAM symbol, and transmits it to a component such as a channel decoder.

The DSP 300 provides information on an offset estimation frequency, which is a difference value between center frequencies of the base station and the terminal to the symbol restorer 400. The offset estimation frequency is given by Equation (2).

$$f_{\hat{C}} = -\text{angle}\left(\frac{P_{k,i}SP_{k,j}^*}{2\pi\Delta nT_S}\right) \quad (2)$$

where $\hat{f}_C$ is the offset value of the carrier frequency between the base station and the terminal, $P_{k,i}$ is the pilot symbol of sub-carrier index k located at the i-th symbol, $\Delta n$ is the sampling index difference between the i-th symbol and the j-th symbol, and $T_S$ is the sampling period.

The DSP 300 provides channel/phase correction information to the symbol restorer 400. The channel/phase correction information is given by Equation (3).

$$\hat{H}_{k,i} = \left(\frac{R_{k,i}}{P_{k,i}}\right) \quad (3)$$

where $\hat{H}_{k,i}$ is the channel estimation value of sub-carrier index k of the i-th symbol, and $R_{k,i}$ is the value corresponding to sub-carrier index k of the i-th symbol among input FFT values.

Figure 2:
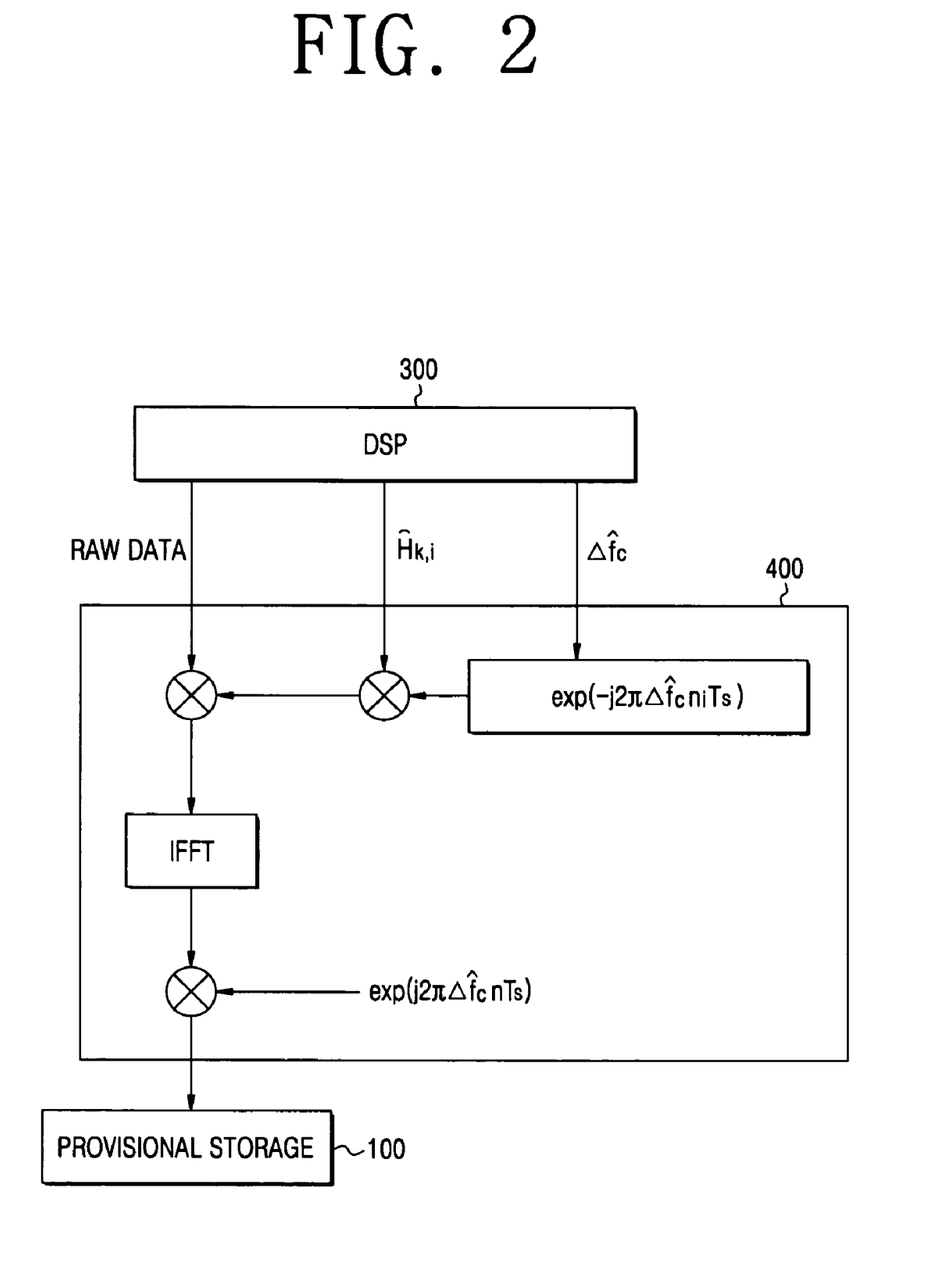
FIG. 2 illustrates a processing procedure of the symbol processor of the uplink signal receiving apparatus using SIC in the OFDMA-based wireless transmission system.

While restoring the data symbol from the demodulated raw data, the symbol restorer 400 removes the restored data symbol of the corresponding terminal from the uplink IF signals stored in the provisional storage 100, and then updates the uplink IF signals at the provisional storage 100. At this time, the symbol restorer 400 distorts the raw data in the frequency domain according to Equation (4), and as shown in FIG. 2.

$$\exp(-j2\pi\Delta\hat{f}_C n_i T_S) \quad (4)$$

where $n_i$ is the sampling index at a point of time when the i-th symbol starts.

The symbol restorer 400 distorts the raw data in the time domain according to Equation (5).

$$\exp(-j2\pi\Delta\hat{f}_C nT_S) \quad (5)$$

where n is the sampling index (n=0, 1, 2, m).

The general function and detailed operation of each of the above-mentioned components will not be described, focus instead being placed on the operation of each component in the present invention.

First, when an uplink radio frequency (RF) signal, which has 2345.005 MHz as the center frequency of a transmission carrier transmitted from a first terminal 1-1 and 2345.005 MHz as the center frequency of a transmission carrier transmitted from a second terminal 1-2, is received through an antenna, the low-noise amplifier of the IF signal processor 10 performs low-noise amplification on the uplink RF signal in order to restore signal intensity.

The uplink RF signal is multiplied by an IF signal supplied from a first local oscillator, and thereby down-converted into an uplink IF signal.

To split the uplink IF signal into I and Q signals, the uplink IF signal is multiplied by each of $\cos(2\pi flFt)$ and $-\sin(2\pi flFt)$ signals supplied from a second local oscillator, and passes through a Analog-to-Digital Converter (ADC) (not shown) for each I&Q signal. Then, the uplink IF signal is split into I and Q signals of a baseband.

Figure 3A:
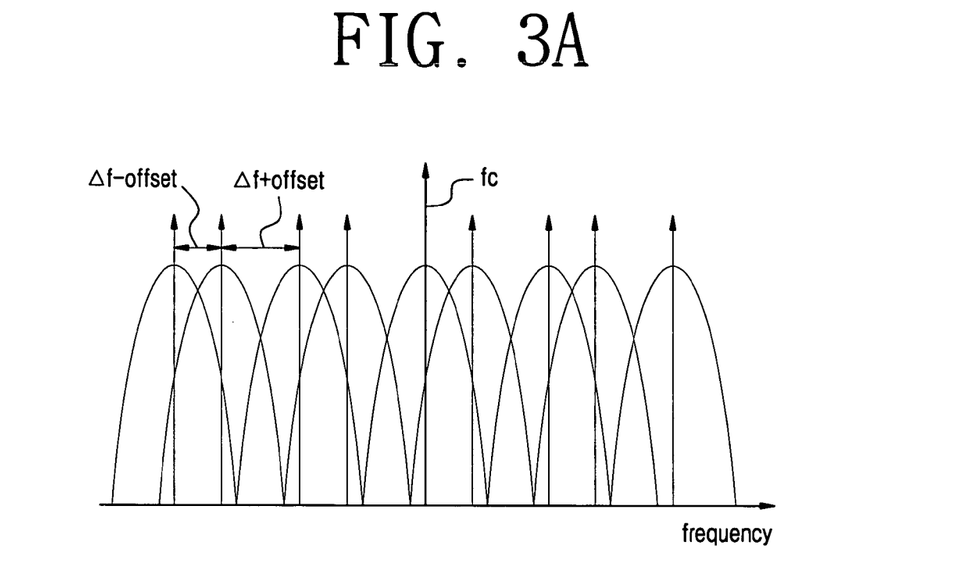
FIG. 3A illustrates uplink intermediate frequency (IF) signals transmitted from first and second terminals.

The provisional storage 100 temporarily stores the uplink IF signal split into I and Q signals of the baseband. At this time, the split uplink IF signals stored in the provisional storage 100 are as shown in FIG. 3A.

The terminal selector 200 selects a terminal that has a data symbol to be demodulated from the uplink IF signals stored in the provisional storage 100. At this time, the terminal selector 200 selects a terminal corresponding to a data symbol having the strongest signal Intensity from the data symbols of the first to n-th terminals 1-1 to 1-n.

Figure 3B:
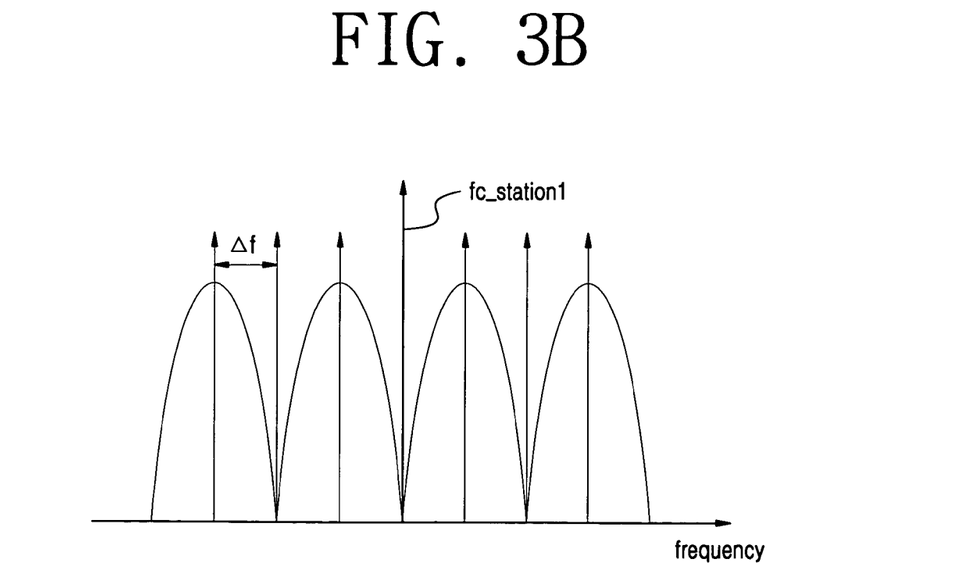
FIG. 3B illustrates the data symbol of a first terminal.

It is assumed that the data symbol of the first terminal 1-1 is selected from the data symbols of the first and second terminal 1-1 and 1-2, as shown in FIG. 3B.

While converting the data symbol of the first terminal 1-1 which is selected through the terminal selector 200 from a time domain into a frequency domain, the DSP 300 corrects the data symbol of the first terminal 1-1 which is converted into the frequency domain, demodulates the corrected data symbol into the raw data, and outputs the demodulated raw data. At this time, the DSP 300 provides information on an offset estimation frequency to the symbol restorer 400, wherein the offset estimation frequency information is a difference value between center frequencies of the base station and the first terminal. This offset estimation frequency is given by Equation (2) the first terminal is represented by $P_{k,i}$.

The DSP 300 provides channel/phase correction information to the symbol restorer 400. The channel/phase correction information is given by Equation (3).

Further, while restoring the data symbol of the first terminal from the demodulated raw data of the first terminal, the symbol restorer 400 removes the restored data symbol of the first terminal from the uplink IF signals stored in the provisional storage 100, and updates the post-removal uplink IF signal at the provisional storage 100. At this time, the symbol restorer 400 distorts the raw data in the frequency domain according to Equation (4).

Figure 3C:
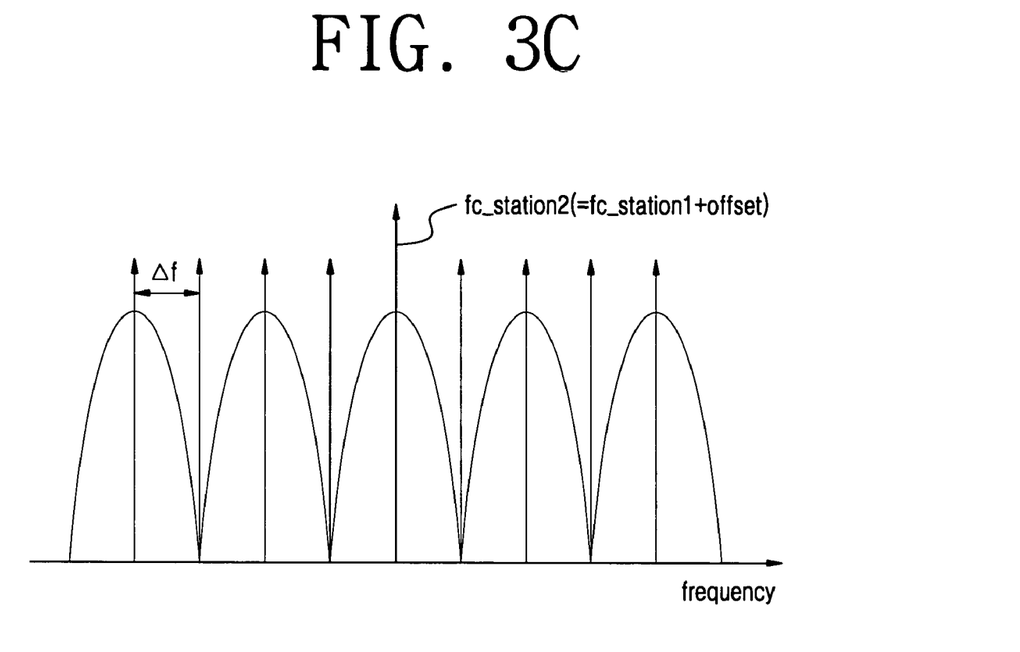
FIG. 3C illustrates the data symbol of a second terminal.
Figure 3D:
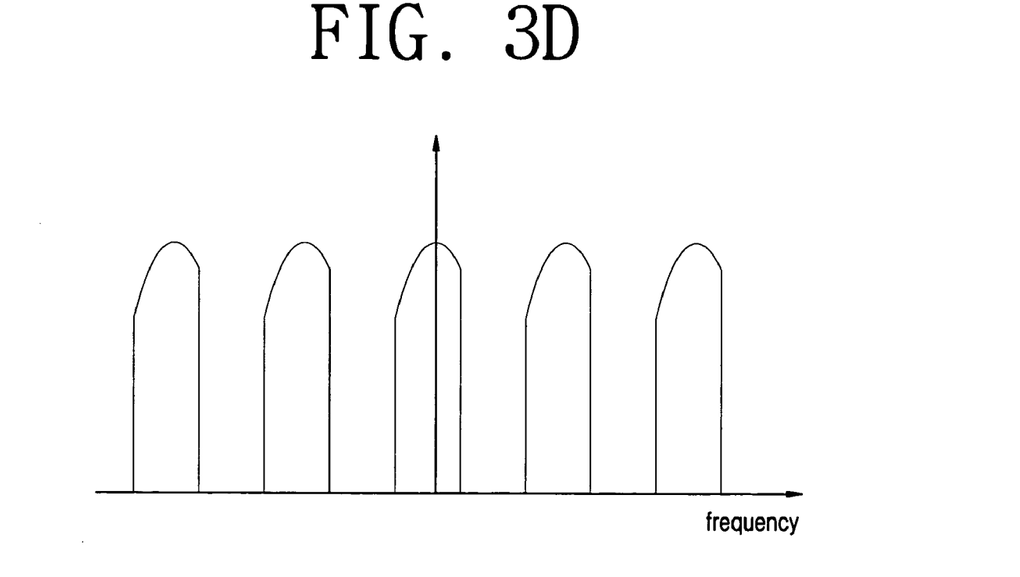
FIG. 3D illustrates an uplink IF signal from which the data symbol of a first terminal is removed.

Accordingly, in the provisional storage 100, the data symbol of the first terminal 1-1 is removed, while the data symbol of the second terminal 1-2 is left, as shown in FIG. 3D. In other words, the original data symbol of the second terminal 1-2 is as shown in FIG. 3C. However, a part where interference between the first and second terminal 1-1 and 1-2 takes place is removed from the uplink IF signal updated at the provisional storage 100.

The terminal selector 200 receives the uplink IF signal, from which the data symbol of the first terminal 1-1 is removed, from the provisional storage 100.

Then, the terminal selector 200 selects the left data symbol of the second terminal 1-2. If there are data symbols of other terminals, the data symbol having the strongest signal intensity is selected.

While converting the data symbol of the second terminal 1-2 selected through the terminal selector 200 from a time domain into a frequency domain, the DSP 300 corrects the data symbol of the second terminal 1-2 which is converted into the frequency domain, demodulates the corrected data symbol into the raw data, and outputs the demodulated raw data. At this time, the DSP 300 provides information on an offset estimation frequency to the symbol restorer 400, wherein the offset estimation frequency information is a difference value between center frequencies of the base station and the second terminal. This offset estimation frequency is given by Equation (2), where $P_{K,L}$ now represents the second terminal.

While restoring the data symbol of the second terminal from the demodulated raw data of the second terminal, the symbol restorer 400 removes the restored data symbol of the second terminal from the uplink IF signals stored in the provisional storage 100, and updates the uplink IF signal at the provisional storage 100. At this time, the symbol restorer 400 distorts the data symbol in the frequency domain according to Equation (4).

Figure 6A:
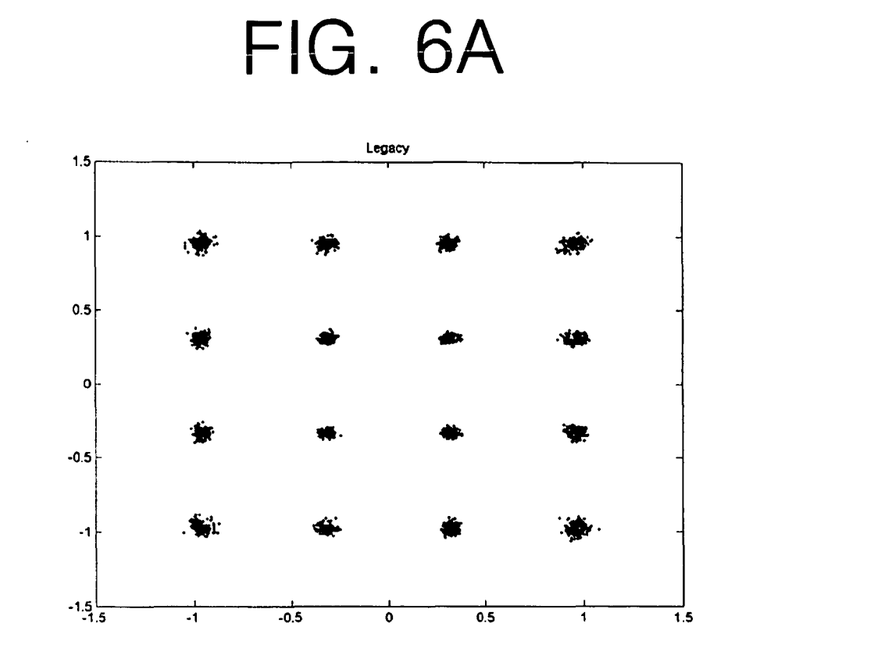
FIG. 6A illustrates demodulated data symbols of first and second terminals that both have a center frequency of 2345.005 MHz in an uplink signal receiving method and apparatus using SIC in a conventional OFDMA-based wireless transmission system.
Figure 6B:
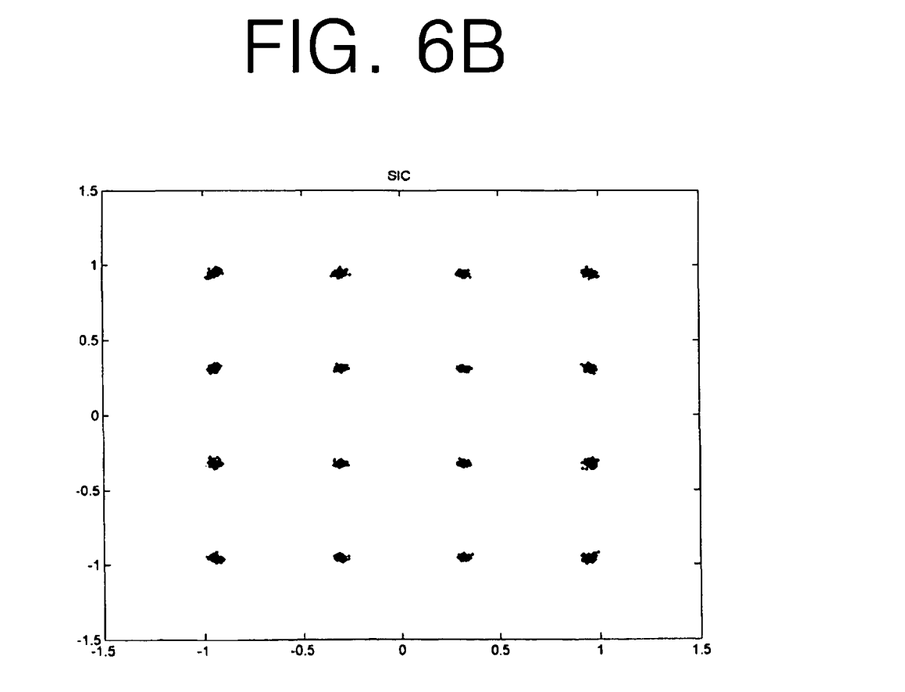
FIG. 6B illustrates demodulated data symbols of first and second terminals that both have a center frequency of 2345.005 MHz in the uplink signal receiving method and apparatus using SIC in the OFDMA-based wireless transmission system illustrated in FIGS. 1 and 4.

When the data symbol of each terminal is restored through the above-described method, the result of improving SIC as shown in FIG. 6B can be obtained, compared to that of FIG. 6A restored using the conventional OFDMA-based system.

Figure 6C:
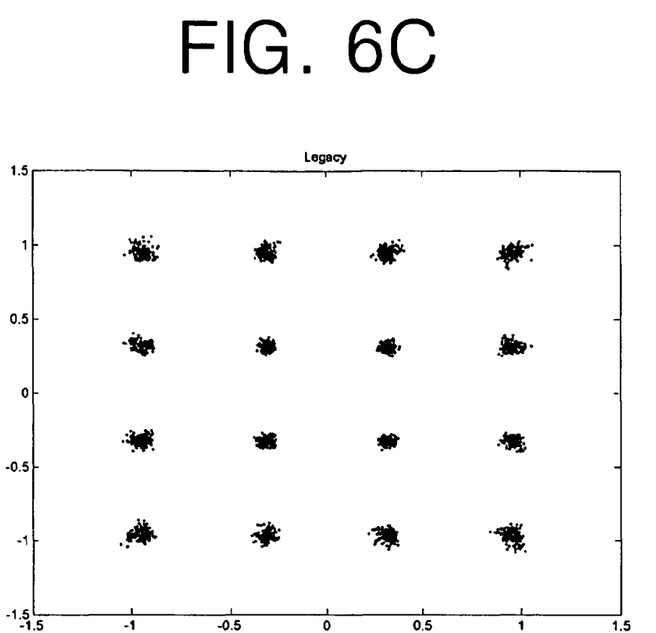
FIG. 6C illustrates demodulated data symbols of first and second terminals that have center frequencies of 2344.995 MHz and 2345.005 MHz respectively in an uplink signal receiving method and apparatus using SIC in a conventional OFDMA-based wireless transmission system.
Figure 6D:
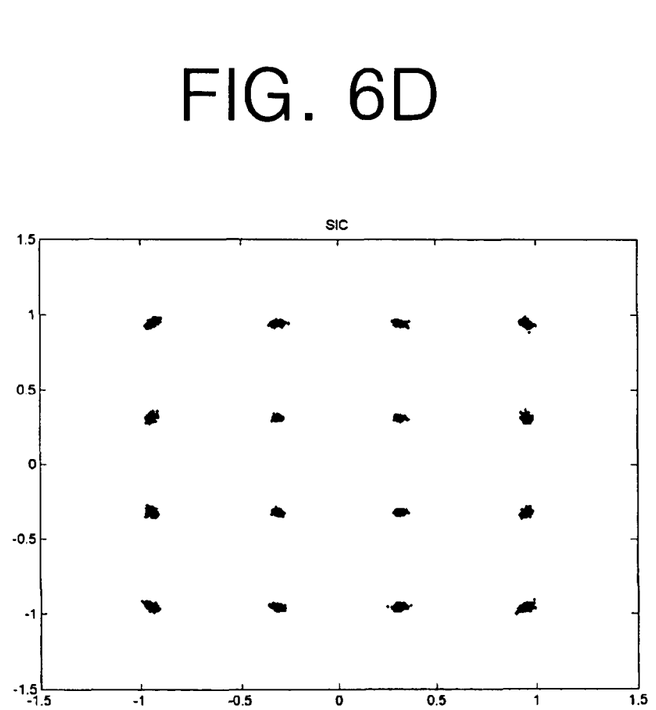
FIG. 6D illustrates demodulated data symbols of first and second terminals that have center frequencies of 2344.995 MHz and 2345.005 MHz respectively in the uplink signal receiving method and apparatus using SIC in the OFDMA-based wireless transmission system illustrated in FIGS. 1 and 4.

In addition, when the center frequency of the data symbol of the first terminal 1-1 is 2344.995 MHz, and the center frequency of the data symbol of the second terminal 1-2 is 2345.005 MHz, the result of improving the SIC as shown in FIG. 6D can be obtained, compared to that of FIG. 6C restored using the conventional OFDMA-based system.

Figure 4:
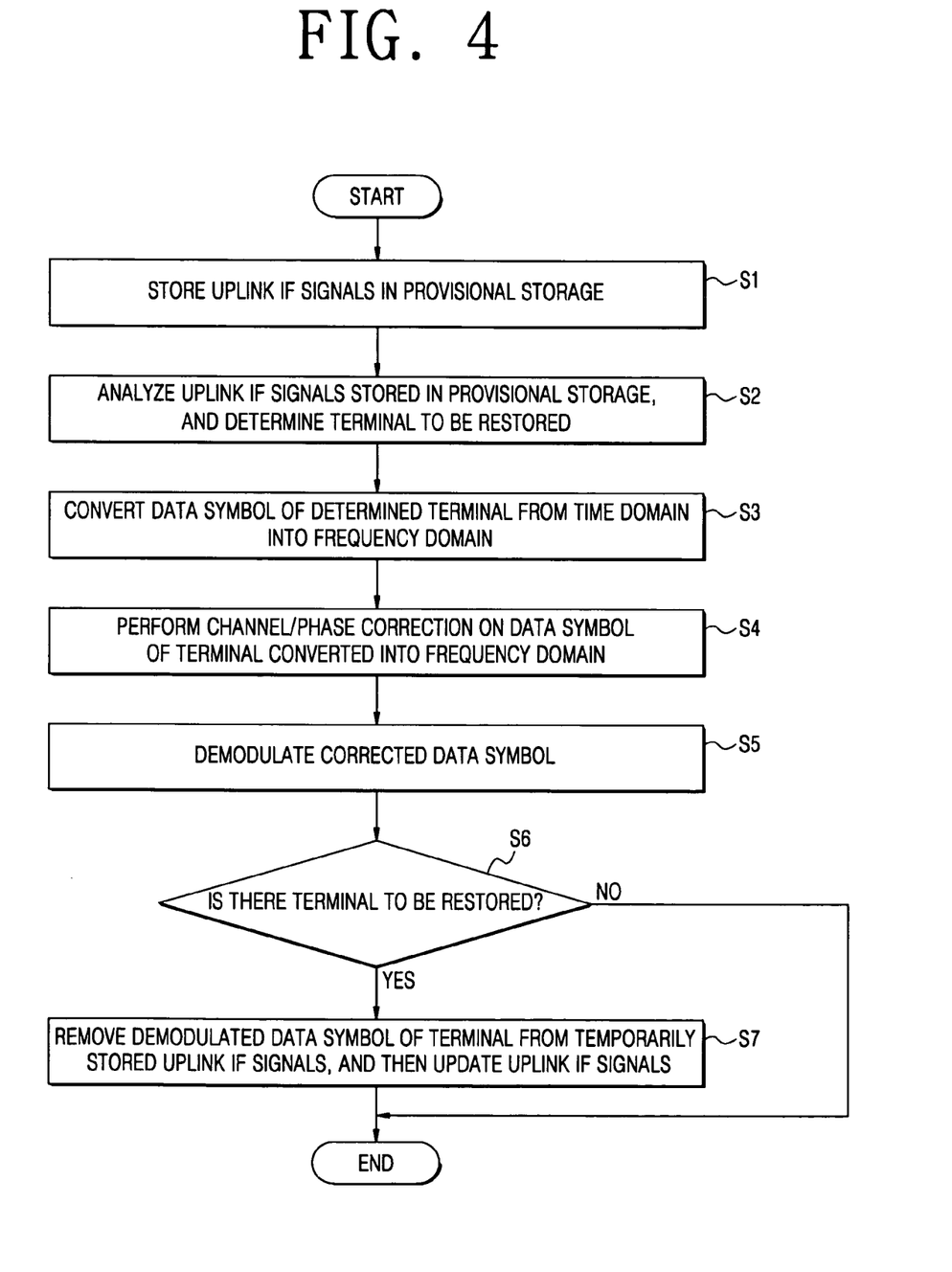
FIG. 4 is a flowchart illustrating an uplink signal receiving method using SIC in an OFDMA-based wireless transmission system in accordance with the present invention.

An uplink signal receiving method using SIC in an OFDMA-based wireless transmission system having the construction as described above, according to the present invention will be described with reference to FIG. 4.

First, when an uplink RF signal, in which the center frequency of the transmission carrier transmitted from the first terminal 1-1 is 2345.005 MHz and the center frequency of the transmission carrier transmitted from the second terminal 1-2 is 2345.005 MHz, is received through an antenna, the low-noise amplifier of the IF signal processor 10 performs low-noise amplification on the uplink RF signal in order to restore signal intensity.

Subsequently, the uplink RF signal is multiplied by an IF signal supplied from the first local oscillator, and thereby is down-converted into an uplink IF signal.

Thereafter, to split the uplink IF signal into I and Q signals, the uplink IF signal is multiplied by each of cos(2πflFt) and −sin(2πflFt) signals supplied from the second local oscillator, and passes through each ADC. Then, each of the uplink IF signals is split into I and Q signals of a baseband.

Therefore, when the uplink RF signal is input through the antenna of the base station, and then each uplink IF signal I(n)+j1(n) passing through each ADC is input, the uplink IF signals are stored in the provisional storage (S1). The uplink IF signals stored in provisional storage are analyzed, and a terminal to be restored is determined (S2). The data symbol of the determined terminal is converted from a time domain into a frequency domain (S3). The data symbol of the terminal which is converted into the frequency domain is subjected to channel/phase correction (S4). Then, the corrected data symbol is demodulated (S5). A determination is made as to whether or not there is another terminal to be restored (S6). At this time, in step S6, if there is a terminal to be restored, the demodulated data symbol of the terminal is removed from the temporarily stored uplink IF signals, and then the uplink IF signals are updated (S7).

Figure 5:
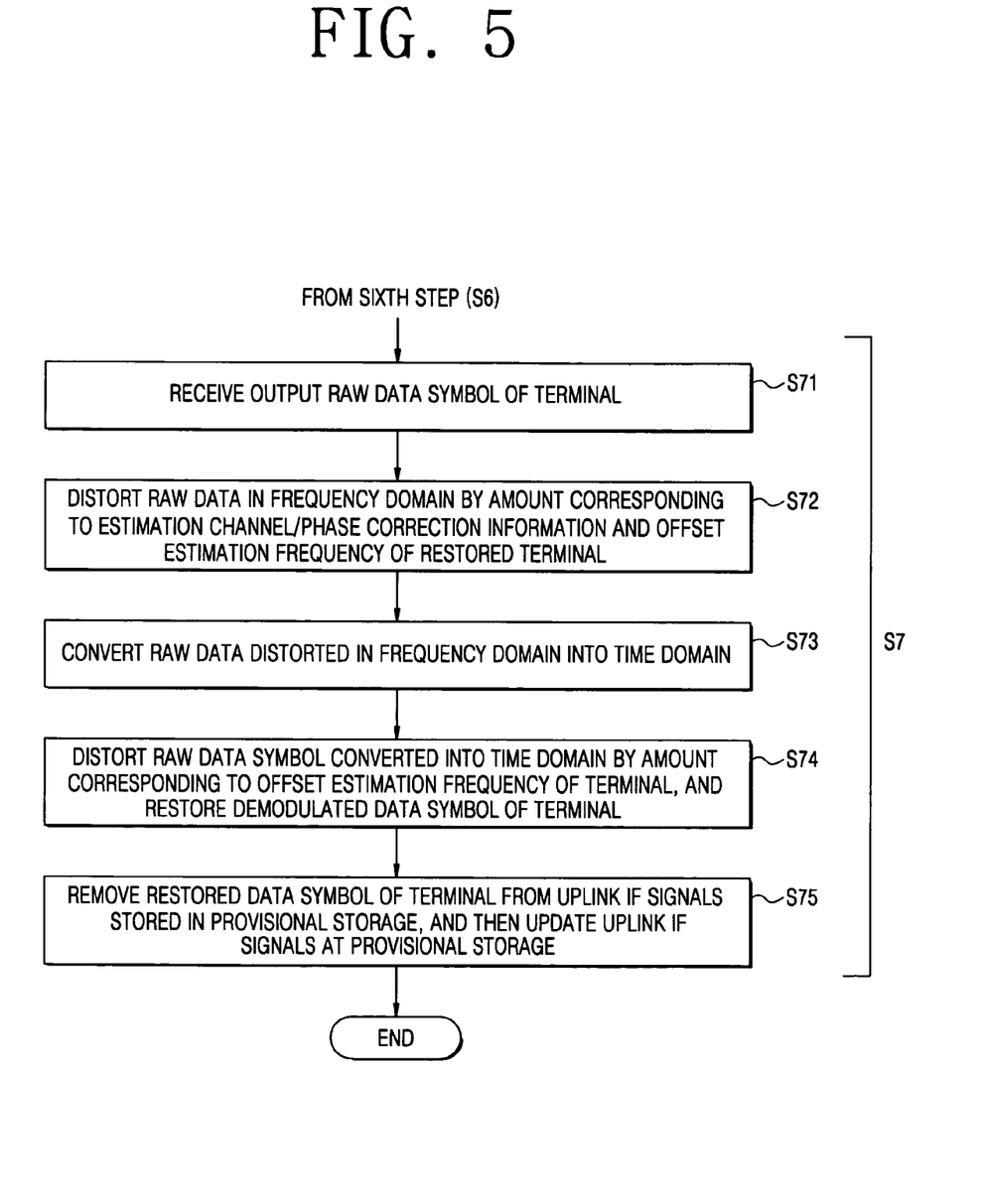
FIG. 5 is a flowchart illustrating a process of the uplink signal receiving method using SIC in the OFDMA-based wireless transmission system illustrated in FIG. 4.

Step (S7) of removing the demodulated data symbol of the terminal from the temporarily-stored uplink IF signals, and then updating the uplink IF signals will now be described in detail with reference to FIG. 5.

First, output raw data symbol of the terminal is received (S71). The raw data is distorted in a frequency domain by an amount corresponding to the channel/phase correction information and offset estimation frequency of the restored terminal (S72). At this time, the offset estimation frequency is given by Equation (2).

The channel/phase correction information of the restored terminal is given by Equation (3).

Then, the raw data distorted in the frequency domain is converted into the time domain (S73). The raw data symbol converted into the time domain is distorted by an amount corresponding to the offset estimation frequency, and thereby the demodulated data symbol of the terminal is restored (S74). In the step of distorting the raw data in the frequency domain by an amount corresponding to the estimation channel/phase correction information and offset estimation frequency of the restored terminal, the raw data is distorted in the frequency domain according to Equation (4).

In the step of distorting the raw data symbol converted into the time domain by an amount corresponding to the offset estimation frequency and then restoring the demodulated data symbol of the terminal, the raw data symbol is distorted in the time domain according to Equation (5).

Then, the restored data symbol of the terminal is removed from the uplink IF signals stored in the provisional storage, and the uplink IF signals are updated at the provisional storage (S75).

FIG. 6B shows data symbols of the terminals restored by repeating the above-described steps, and FIG. 6A shows data symbols of the terminals restored using the conventional OFDMA-based system. Clearly, the present invention yields better SIC than the convention art.

In addition, FIG. 6B shows data symbols of the terminals restored by repeating the above-described steps, and FIG. 6A shows data symbols of the terminals restored using the conventional OFDMA-based system, when the center frequency of the data symbol of the first terminal 1-1 is 2344.995 MHz, and the center frequency of the data symbol of the second terminal 1-2 is 2345.005 MHz. Clearly, in this case as well, the present invention enables better SIC than the conventional art.

As described above, according to the uplink signal receiving method and apparatus using SIC in the OFDMA-based wireless transmission system of the present invention, it is possible to reduce interference between the sub-carriers of the terminals caused by deviation of center frequency of sub-carriers among terminals constituting the uplink signal. Thus, the reception performance of the base station can be improved, and communication can be made more reliable compared to the conventional art.

While the present invention has been described with reference to an exemplary embodiment thereof, those of ordinary skill in the art will understand that various modifications can be made to the described embodiment within the spirit and scope of the present invention as defined by the following claims.

What is claimed is:

1. An uplink signal receiving method using successive interference cancellation (SIC) in a wireless transmission system based on Orthogonal Frequency Division Multiple Access (OFDMA), the uplink signal receiving method comprising the steps of:

storing in a provisional storage each uplink intermediate frequency (IF) signal received through an antenna of a base station and subjected to analog-to-digital conversion;

analyzing the uplink IF signals stored in the provisional storage in order to determine a terminal having a data symbol to be restored;

converting the data symbol of the terminal from a time domain into a frequency domain;

performing channel/phase correction on the converted data symbol;

demodulating the corrected data symbol;

determining if there is another terminal having another data symbol to be restored; and when there is another terminal, removing the demodulated data symbol of the terminal from the temporarily stored uplink IF signals in accordance with channel phase correction information and an offset estimate frequency, and then updating the uplink IF signals in the provisional storage.

2. The uplink signal receiving method according to claim 1, wherein the step of removing the demodulated data symbol comprises:

receiving an output raw data symbol of the terminal;
distorting the raw data in the frequency domain by an amount corresponding to estimation channel/phase correction information and offset estimation frequency of the data symbol restored terminal;
converting the raw data distorted in the frequency domain into the time domain;
distorting the raw data symbol in the time domain by an amount corresponding to the offset estimation frequency of the terminal, and restoring the demodulated data symbol of the terminal; and
removing the restored demodulated data symbol of the terminal from the uplink IF signals stored in the provisional storage, and then updating the uplink IF signals at the provisional storage.

3. The uplink signal receiving method according to claim 2, wherein the offset estimation frequency is expressed as in $$\hat{f_C} = -\text{angle}\left(\frac{P_{k,i}SP_{k,j}^*}{2\pi\Delta nT_S}\right)$$

where $\hat{f}_C$ is the offset value of the carrier frequency between the base station and the terminal, Pk,i is the pilot symbol of sub-carrier index k located at the i-th symbol, Δn is the sampling index difference between the i-th symbol and the j-th symbol, and TS is the sampling period.

4. The uplink signal receiving method according to claim 2, wherein the channel/phase correction information of the restored terminal is given $$\hat{H}_{k,i} = \left(\frac{R_{k,i}}{P_{k,i}}\right)$$

where $\hat{H}_{k,i}$ is the channel estimation value of sub-carrier index k of the i-th symbol, and Rk,i is the value corresponding to sub-carrier index k of the i-th symbol among input Fast Fourier Transform (FFT) values.

5. The uplink signal receiving method according to claim 2, wherein the raw data is distorted in the frequency domain according to $$\exp(-j2\pi\Delta\hat{f}_C n_i T_S)$$

where ni is the sampling index at a point of time when the i-th symbol starts.

6. The uplink signal receiving method according to claim 2, wherein in the raw data symbol is distorted in the time domain according to $$\exp(-j2\pi\Delta\hat{f}_C nT_S)$$

where n is the sampling index (n=0, 1, 2, ... m).

7. An uplink signal receiving apparatus using successive interference cancellation (SIC) in a wireless transmission system based on Orthogonal Frequency Division Multiple Access (OFDMA), the uplink signal receiving apparatus comprising:
a provisional storage for temporarily storing each uplink intermediate frequency (IF) signal that is received through an antenna of a base station and subjected to analog-to-digital conversion;
a terminal selector for selecting a terminal that has a data symbol to be demodulated from the uplink IF signals stored in the provisional storage;
a digital signal processor (DSP) for converting the data symbol of the selected terminal from a time domain into a frequency domain, correcting the data symbol which is converted into the frequency domain, demodulating the corrected data symbol into raw data, and outputting the demodulated raw data; and
a symbol restorer for restoring the data symbol from the demodulated raw data, removing the restored data symbol from the uplink IF signals stored in the provisional storage in accordance with channel phase correction information and an offset estimate frequency, and then updating the uplink IF signals in the provisional storage.

8. The uplink signal receiving apparatus according to claim 7, wherein the DSP provides channel/phase correction information to the symbol restorer.

9. The uplink signal receiving apparatus according to claim 8, wherein the channel/phase correction information is given by $$\hat{H}_{k,i} = \left(\frac{R_{k,i}}{P_{k,i}}\right)$$

where $\hat{H}_{k,i}$ is the channel estimation value of sub-carrier index k of the i-th symbol, and Rk,i is the value corresponding to sub-carrier index k of the i-th symbol among input Fast Fourier Transform (FFT) values.

10. The uplink signal receiving apparatus according to claim 7, wherein the DSP provides information on an offset estimation frequency to the symbol restorer.

11. The uplink signal receiving apparatus according to claim 10, wherein the offset estimation frequency information is a difference between center frequencies of a base station and the terminal.

12. The uplink signal receiving apparatus according to claim 11, wherein the offset estimation frequency is expressed as $$\hat{f_C} = -\text{angle}\left(\frac{P_{k,i}SP_{k,j}^*}{2\pi\Delta nT_S}\right)$$

where $\hat{f}_C$ is the offset value of the carrier frequency between the base station and the terminal, Pk,i is the pilot symbol of sub-carrier index k located at the i-th symbol, Δn is the sampling index difference between the i-th symbol and the j-th symbol, and TS is the sampling period.

13. The uplink signal receiving apparatus according to claim 7, wherein the symbol restorer distorts the raw data in the frequency domain according to $$\exp(-j2\pi\Delta\hat{f}_C n_i T_S)$$

where ni is the sampling index at a point of time when the i-th symbol starts.

14. The uplink signal receiving apparatus according to claim 7, wherein the symbol restorer distorts the raw data symbol in the time domain according to $$\exp(-j2\pi\Delta\hat{f}_C nT_S)$$

where n is the sampling index (n=0, 1, 2, ... m).

* * * * *